June 20, 1944. J. C. CARPENTER 2,351,599
PHOTOGRAPHIC ENLARGER
Filed Sept. 29, 1941
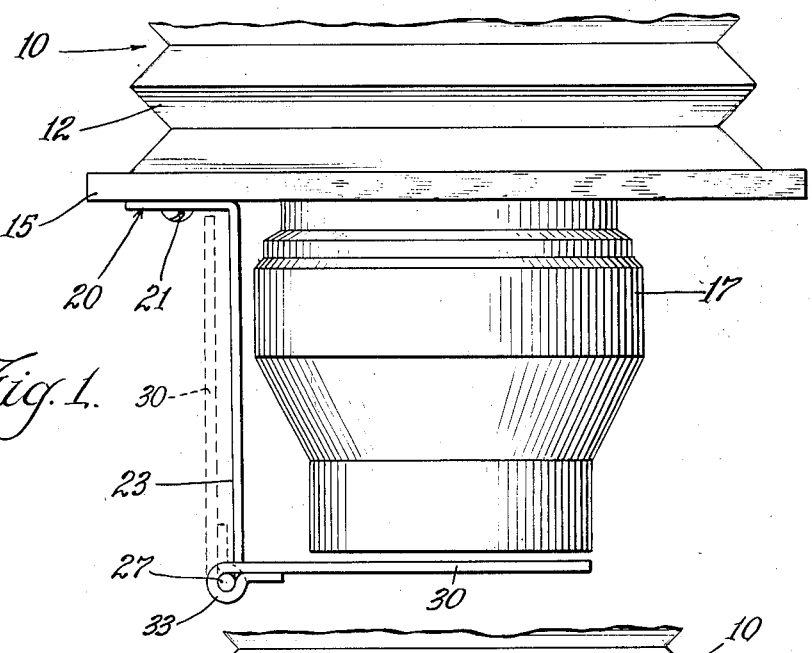
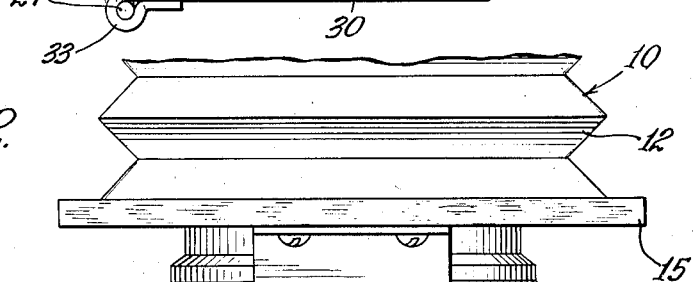
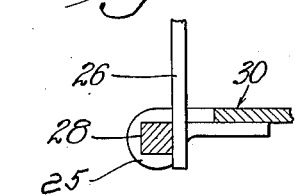
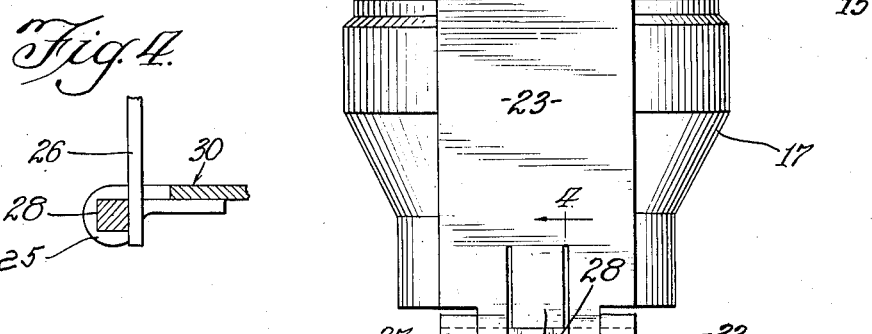
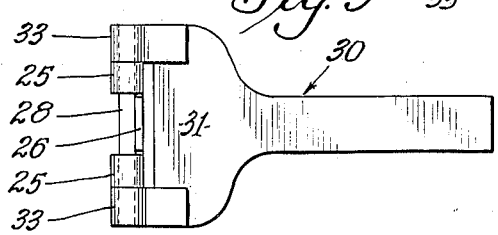
Inventor:
John C. Carpenter
By: Frank H. Marks,
Atty.

Patented June 20, 1944

2,351,599

UNITED STATES PATENT OFFICE 2,351,599

PHOTOGRAPHIC ENLARGER

John C. Carpenter, Chicago, Ill., assignor to Sears, Roebuck and Co., Chicago, Ill., a corporation of New York Application September 29, 1941, Serial No. 412,775

3 Claims. (Cl. 88—24)

My invention relates to photographic enlargers, and has to do more particularly with an enlarger having an improved focusing device.

In the use of enlargers other than those having an automatic focusing arrangement, which are quite expensive, considerable difficulty is experienced, especially by the amateur, in obtaining a wire-sharp focus. While a fairly sharp focus can be obtained by projecting on an easel or other white background an image of the negative being worked from, it is usually impossible by this visual method to obtain a precisely focused image, especially when the negative is on the soft side. Hence, it is not uncommon that a fuzzy, out-of-focus print is obtained, even though the image appeared satisfactory when the focus was adjusted.

Various crude methods have been used to remedy this situation, such as by substituting for the negative a film having sharp scratches or markings thereon, and subsequently replacing the negative. Such methods, however, are tedious and time consuming.

My invention is an application of a known optical principle, namely, that when an obstruction, such as an elongated relatively narrow object is placed adjacent a lens from which an image is being projected, a dougle image will be formed on an easel or the like, unless the lens is moved to the proper focus, at which point the double image will coalesce to form a single image. This principle has heretofore been utilized crudely in connection with enlargers.

An object of my invention is to provide an enlarger having attached thereto a focusing device movable from an operative position below the lens to a position completely out of the way, where it will not obstruct the movements of the operator.

Another object is to provide such a device which will be simple in construction, economical to fabricate and thoroughly satisfactory for the purposes desired.

Various other objects and advantages will probably suggest themselves to those skilled in the art as the description proceeds.

Referring now to the drawing, forming a part of this application, and illustrating a preferred embodiment of my invention:

Fig. 1 is a fragmentary front elevational view of the lower portion of an enlarger carrying a focusing attachment embodying my invention, Fig. 2 is a side elevational view of the same, Fig. 3 is a bottom plan view, and Fig. 4 is a fragmentary section taken on line 4—4 of Fig. 2.

The numeral 10 indicates generally an enlarger to which my invention is applied. The enlarger may be of any standard or other desired type, except of the automatic focusing type, the numeral 12 representing a bellows, to the lower end of which is secured a lens board 15, a lens housing 17 being mounted in said board.

To the lower face of the lens board 15 is secured a bracket element 20, as by screws 21 or other suitable means. The bracket 20 may be of angular formation having a depending portion 23, the lower extremity of which is preferably curled as at 25, to provide a pair of speed trunnions receiving a pintle 27. It should be noted that the hinge elements 25 project laterally from bracket portion 23, for a purpose which will presently appear. (Fig. 1.) The pintle is preferably squared at 28, intermediate the elements 25, as seen in Fig. 4.

I provide a relatively narrow, elongated masking element in the form of a plate 30 having a bifurcated base portion 31, the edges of the bifurcations being curled as at 33, fixedly receiving pintle 27.

It will be seen that the masking element or the plate 30 is hingedly secured to the bracket element 20 by means of the pintle 27, so that the plate 30 is movable from a horizontal position adjacent the lower extremity of the lens mount, as seen in full lines in Figure 1, to a vertical position, as seen dotted in Figure 1, wherein the plate 30 is completely out of the way. In the out of the way position, the operator may move his hands freely about the lens mount, as in "dodging," etc., without fear of collision with any projecting part. By reason of the squared portion 28 of the pintle, the plate 23 will be retained at the horizontal and vertical positions, since the pintle turns with the plate, the squared portion of the pintle resiliently seating against the tongue 26.

The bracket 20 and plate 30 may be conveniently and economically stamped of sheet material, such as metal, plastic, etc. However, I do not consider myself restricted to this particular mode of construction but may form the parts by other means, as by molding, or from wire, or otherwise.

Obviously, while my invention will find its greatest application to enlargers, it is not necessarily restricted thereto but may be applied to other optical projection apparatus, such as slide or moving picture projectors, etc.

Various other changes and modifications may suggest themselves to those skilled in the art, without departing from the spirit of my invention, and, hence, I do not wish to be restricted to the specific forms shown or uses mentioned, except to the extent indicated in the appended claims.

I claim:

1. In combination with a projection apparatus which includes a lens, a lens mount and a lens board from which said mount extends, a bracket element secured to the board and extending therefrom at one side of said mount, a masking element, and means connecting said elements at an axis parallel to the plane of said lens board, said connecting means including a pintle fixed to one of said elements, the other element having a resilient tongue bearing against said pintle and the pintle having flat surfaces respectively engageable with said tongue when the masking element extends across the end of the lens and also when it extends from said pintle toward the lens board.

2. In combination with a projection apparatus which includes a lens, a lens mount and a lens board from which said mount extends, a bracket secured to the board and extending therefrom at one side of said mount, and an elongated relatively narrow element dimensioned to extend diametrically across the lens mount at the outer end thereof and hingedly attached to said bracket at an axis substantially parallel to said lens board, said element being adjustable about said axis to a position in which it extends from the axis toward the plane of the board.

3. In combination with a projection apparatus which includes a lens, a lens mount and a lens board from which said mount extends, a bracket secured to the board and extending therefrom at one side of said mount, and an elongated relatively narrow element dimensioned to extend diametrically across the lens mount at the outer end thereof and hingedly attached to said bracket at an axis substantially parallel to said lens board, said element being adjustable about said axis to a position in which it extends from the axis toward the plane of the board, together with automatic yielding detent means operative to retain said element in its position extending across the end of the lens mount and also at said other position extending toward the lens board.

JOHN C. CARPENTER.